UNITED STATES PATENT OFFICE.

EUGENE BLOCH, OF NEW YORK, N. Y.

COATING PROCESS.

1,110,741.  Specification of Letters Patent.  Patented Sept. 15, 1914.

No Drawing.   Application filed March 2, 1912.   Serial No. 681,285.

*To all whom it may concern:*

Be it known that I, EUGENE BLOCH, a citizen of the United States, residing at New York, in the county of New York and State of New York, have invented certain new and useful Improvements in Coating Processes, of which the following is a specification.

This invention relates to coating processes; and it comprises a process of coating concrete or cement objects, such as walls, or objects of other calcareous or alkaline material, wherein such object is given a preliminary or priming coat of a fluent composition of raw Pontianak rubber, which is best preliminarily treated to remove moisture, and is thereafter given a second or main coating; all as more fully hereinafter set forth and as claimed.

In the coating of concrete walls and like objects in the ordinary way of painting, much trouble is experienced in securing a good, cohering and permanent coat. This is largely due to the effect of the lime (and other alkaline substances present in lime and cement plastics) upon the saponifiable matter of ordinary paints and varnishes. Lime and other soaps are formed which are friable and oxidizable and at the same time the bond of the calcareous surface materials is injured. Attempts have been made to obviate these difficulties by preliminarily treating the concrete or other surface with an acid or saline wash meant to remove or neutralize the free lime or alkali; as by washing concrete with hydrochloric, surfuric or oxalic acid; but this of course interferes with the surface bond, rendering the surface friable and loose. Other attempts have been made to apply an acid treatment in the coating operation by using various acid coating materials, such as free oil acids, resin acids, and the like; but these also interfere with the surface bond and moreover form lime soaps and other soaps which are not permanent.

I have discovered that I can produce permanent and cohering coatings on walls and other objects made of or comprising, or surfaced with cement, grout, plaster (gypsum), mortar, whitewash, etc., by giving such wall or object a priming coat of a composition of crude Pontianak rubber and applying a thicker or main coating which may be of the same material; or, and usually, is of another material. Pontianak rubber, often called gum Pontianak or " gum ponty," as it comes into the country is a very moist material which contains resin and rubber in something like the proportion of eight or ten to one, although these proportions are more or less variable; that is, there is much more resin than rubber. The resin present is mostly non-saponifiable, containing but a small proportion of acid constituents. This resin may be separated from the rubber and directly applied as a coating to cement and other walls, but for this purpose it is much improved by removing such saponifiable matter as is present; which may be done by preliminarily boiling it with a solution of caustic soda or carbonate of soda, washing and drying the residue. This residue now being free of saponifiable matter neither affects a concrete wall nor is affected thereby. But the Pontianak resin, in and of itself, whether free or saponifiable matter or in its original condition, is not a very good coating material, being more or less friable and brittle. I have discovered however that by using crude Pontianak rubber containing the resin and the rubber in the usual proportions in which they naturally occur, I can produce a composition which serves excellently well for the present purposes. The amount of the rubber constituent present is about that which gives the necessary elasticity and toughness to the coating film while this rubber also serves to obviate the slight attackability of the accompanying resin. A fluent composition made by dissolving the crude Pontianak rubber in a suitable solvent after drying off the water present, is an excellent material for primer-coating cement and concrete walls, walls having mortar joints, walls faced with concrete or grout, etc.

In the present invention, I may take crude Pontianak rubber containing, say, 50 per cent moisture and 35 to 40 per cent resin with the residue rubber. This crude gum or rubber I first dry. This may be done by sheeting it and exposing to a current of air of low temperature. After drying I may directly dissolve it in any suitable solvent, such as turpentine, coal tar naphtha, benzin, petroleum spirits, etc. Prior to drying the crude gum or rubber, I may extract a part or all of the saponifiable constituents by boiling it with caustic soda or carbonate of soda. I may however use the crude rubber or gum without this treatment to remove acid constituents. And in making the priming composition, I may mix the crude material not treated with alkali with any proportion of material which has been treated with alkali. Where primer coatings of special and particular character are desired, the solution of the crude gum or rubber may be mixed with other varnish gums or materials. Inasmuch however as the material to be used on walls having alkaline components, these other gums or resins should be first treated to remove saponifiable ingredients. For example, Indian copal may be used. In this event, 100 parts of such copal may be reduced to a fine powder and heated with a solution of 30 parts caustic potash, or 125 parts of carbonate of soda, in 200 parts of water; the soap solution produced removed and the residue washed and dried. This residue may be dissolved in a solvent and mixed with the Pontianak solution produced as above described. The proportions of the two may be as desired for the particular purposes. Another good admixture may be made by taking 100 parts of kauri copal reduced to a powder, heating with 18 parts of caustic soda or 120 parts of carbonate of soda in 200 parts of water, separating the turbid soap solution from the unsaponifiable resins, washing the latter till the wash water is no longer alkaline, drying in a current of air and then dissolving in a suitable solvent; say, denatured alcohol or acetone.

In the present invention, having produced a solution composed of or comprising Pontianak gum or rubber and containing both resin and rubber, I treat the wall or object with this solution. The ratio between the Pontianak rubber and the solvent should be such as to give a fluent, spreadable composition. This composition when applied to the wall or other object coheres to it firmly and does not affect the bond between the surface particles of such wall. After this first or primer coat has dried, another coating of any desired coating material may be applied. This second coating being spaced from the wall, to which it is united by the primer coat, is not affected by alkaline components of such wall and may be of any composition desired. The operation is the same when the Pontianak solution, or primer coating, is admixed with non-saponifiable matters obtained in the way previously described.

Any desired fillers or pigments may be admixed with the primer coat prior to application, as for instance, barytes or blanc fixe, satin white, whiting, lithopone, white lead, sublimed lead, pearl hardening, zinc white, ocher, Indian red, chrome, yellow, etc. The primer coating being substantially unattacked by basic materials, any desired pigment or filler may be used. Fillers or pigments may of course also be used with the second coating.

If, for any reason, it is desirable to produce a coating composition having a greater rubber content than would be obtained by using Pontianak alone, rubber from other sources may be added to the Pontianak to give the desired composition.

What I claim is:—

1. The process of coating surfaces, such as concrete and the like, comprising alkaline materials which comprises applying thereto a fluent priming composition containing gum Pontianak.

2. The process of coating surfaces, such as concrete and the like, comprising alkaline materials which comprises applying thereto a fluent priming composition containing gum Pontianak, and thereafter applying a main coating of fluent material.

3. The process of coating surfaces, such as concrete and the like, comprising alkaline materials which comprises applying thereto a fluent priming composition containing gum Pontianak, and thereafter applying a main coating of another fluent material.

4. The process of coating surfaces, such as concrete and the like, comprising alkaline materials which comprises applying thereto a fluent priming composition containing gum Pontianak and another gum coating material free of saponifiable matter.

5. The process of coating surfaces, such as concrete and the like, comprising alkaline materials which comprises applying thereto a fluent priming composition containing gum Pontianak, and another gum coating material free of saponifiable matter, and thereafter applying a main coating of fluent material.

6. The process of coating surfaces, such as concrete and the like, comprising alkaline materials which comprises applying thereto a fluent priming composition containing gum Pontianak and another gum coating material free of saponifiable matter and thereafter applying a main coating of another fluent material.

7. The process of coating surfaces, such as concrete and the like, comprising alkaline materials which comprises applying thereto a fluent priming composition containing gum Pontianak and a fossil gum which has been freed of saponifiable matter, and thereafter applying a main coating of another fluent material.

In testimony whereof, I affix my signature in the presence of two subscribing witnesses.

EUGENE BLOCH.

Witnesses:
 CHAS. SCHUBART,
 JULIAN H. RUST.